United States Patent
Hung

(10) Patent No.: US 12,192,793 B2
(45) Date of Patent: Jan. 7, 2025

(54) SMALL CELL MILLIMETER WAVE AND SUB-6 GHz MODULES COEXISTENCE

(71) Applicant: QUALCOMM Incorporated, San Diego, CA (US)

(72) Inventor: Pi-Sung Hung, Keelung (TW)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 17/650,810

(22) Filed: Feb. 11, 2022

(65) Prior Publication Data

US 2023/0262484 A1 Aug. 17, 2023

(51) Int. Cl.
*H04W 88/00* (2009.01)
*G06F 13/42* (2006.01)
*H04W 24/02* (2009.01)

(52) U.S. Cl.
CPC ........ *H04W 24/02* (2013.01); *G06F 13/4221* (2013.01); *G06F 2213/0026* (2013.01)

(58) Field of Classification Search
CPC ... H04W 24/02; H04W 88/10; G06F 13/4221; G06F 2213/0026; G06F 13/4295
See application file for complete search history.

(56) References Cited

U.S. PATENT DOCUMENTS

| | | | | |
|---|---|---|---|---|
| 2020/0107169 A1* | 4/2020 | Chin | .................... | H04L 61/5038 |
| 2021/0075631 A1* | 3/2021 | Liao | .................. | H04M 15/8038 |
| 2022/0361116 A1* | 11/2022 | Lee | ........................ | H04W 52/52 |
| 2023/0188464 A1* | 6/2023 | Dagys | ................. | H04L 65/1045 |
| | | | | 370/389 |

\* cited by examiner

*Primary Examiner* — Lakeram Jangbahadur
(74) *Attorney, Agent, or Firm* — QUALCOMM Incorporated

(57) ABSTRACT

A network node apparatus may be configured to receive, from a first user equipment (UE), a first transmission including an indication of a first protocol identifier. The apparatus may further be configured to communicate with the first UE using a first protocol associated with the first protocol identifier. The apparatus may also be configured to receive, from a second UE, a second transmission including an indication of a second protocol identifier. The apparatus may further be configured to communicate with the second UE using a second protocol associated with the second protocol identifier. The apparatus may include a shared kernel space driver for a first PCIe interface and a second PCIe interface, a first modem connected to the shared kernel space driver via the first PCIe interface, and a second modem connected to the shared kernel space driver via the second PCIe interface.

17 Claims, 12 Drawing Sheets

SMALL CELL MILLIMETER WAVE AND SUB-6 GHz MODULES COEXISTENCE

TECHNICAL FIELD

The present disclosure relates generally to communication systems, and more particularly, to wireless communications with small cells.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to receive, from a first user equipment (UE), a first transmission including an indication of a first protocol identifier. The apparatus may further be configured to communicate with the first UE using a first protocol associated with the first protocol identifier. The apparatus may also be configured to receive, from a second UE, a second transmission including an indication of a second protocol identifier. The apparatus may further be configured to communicate with the second UE using a second protocol associated with the second protocol identifier.

In an aspect of the disclosure, an apparatus is provided. The apparatus may include a shared kernel space driver for a first peripheral component interconnect express (PCIe) interface and a second PCIe interface, a first modem connected to the shared kernel space driver via the first PCIe interface, and a second modem connected to the shared kernel space driver via the second PCIe interface.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
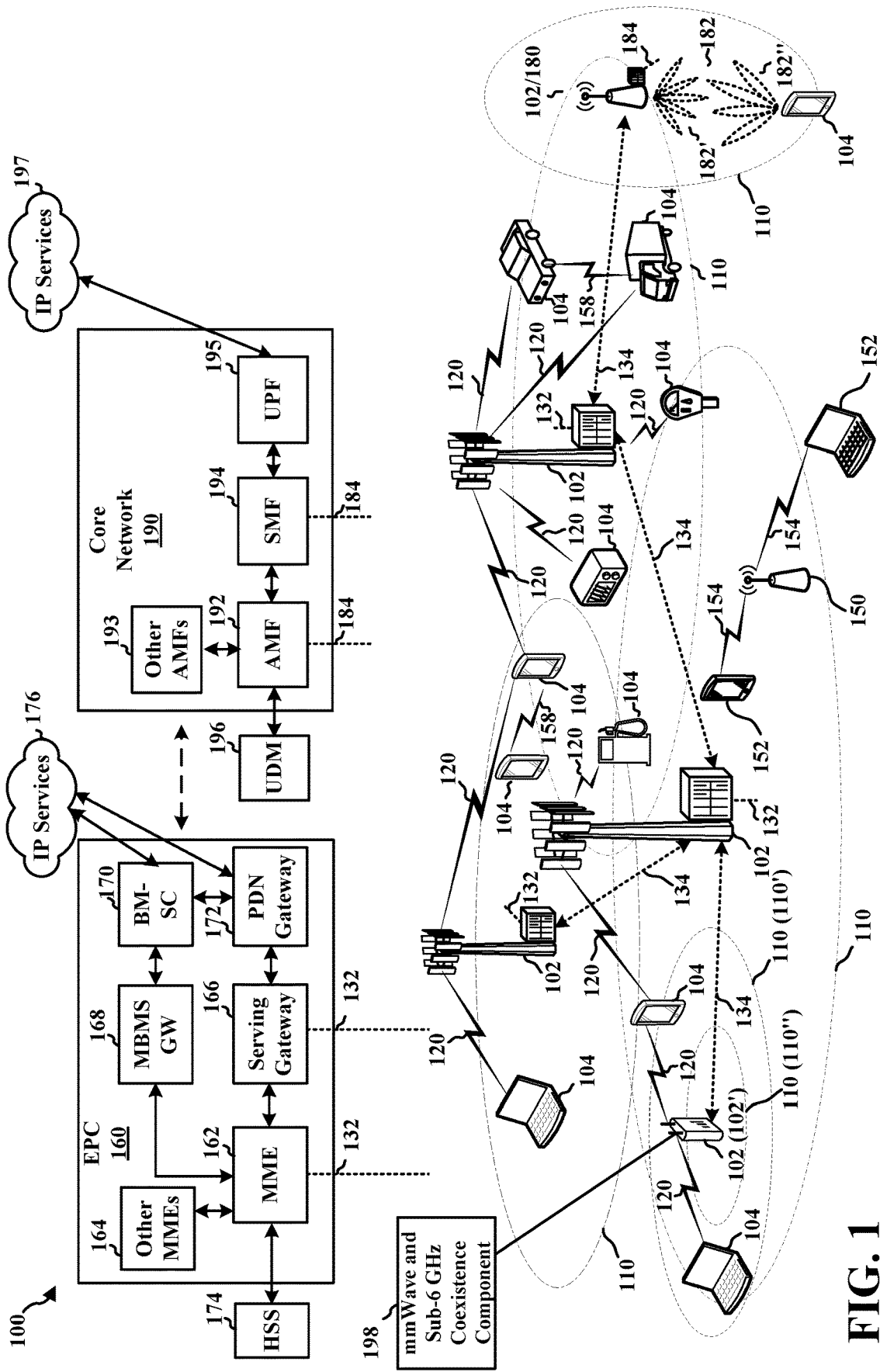
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The wireless communication system may be implemented by a set of network nodes and/or a set of network entities. A network node can be implemented as an aggregated base station, as a disaggregated base station, a small cell base station, an integrated access and backhaul (IAB) node, a relay node, a sidelink node, etc. A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a first coverage area 110' associated with a first frequency range and a second coverage area 110" associated with a second frequency range that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the small cell base station 102' may include a mmWave and Sub-6 GHz coexistence component 198 that is configured to receive, from a first UE, a first transmission including an indication of a first protocol identifier. The mmWave and Sub-6 GHz coexistence component 198 may also be configured to communicate with the first UE using a first protocol associated with the first protocol identifier. The mmWave and Sub-6 GHz coexistence component 198 may also be configured to receive, from a second UE, a second transmission including an indication of a second protocol identifier. The mmWave and Sub-6 GHz coexistence component 198 may further be configured to communicate with the second UE using a second protocol associated with the second protocol identifier. Although the following description may be focused on 5G NR, the concepts described herein may be applicable to other similar areas, such as LTE, LTE-A, CDMA, GSM, and other wireless technologies.

Figure 2:
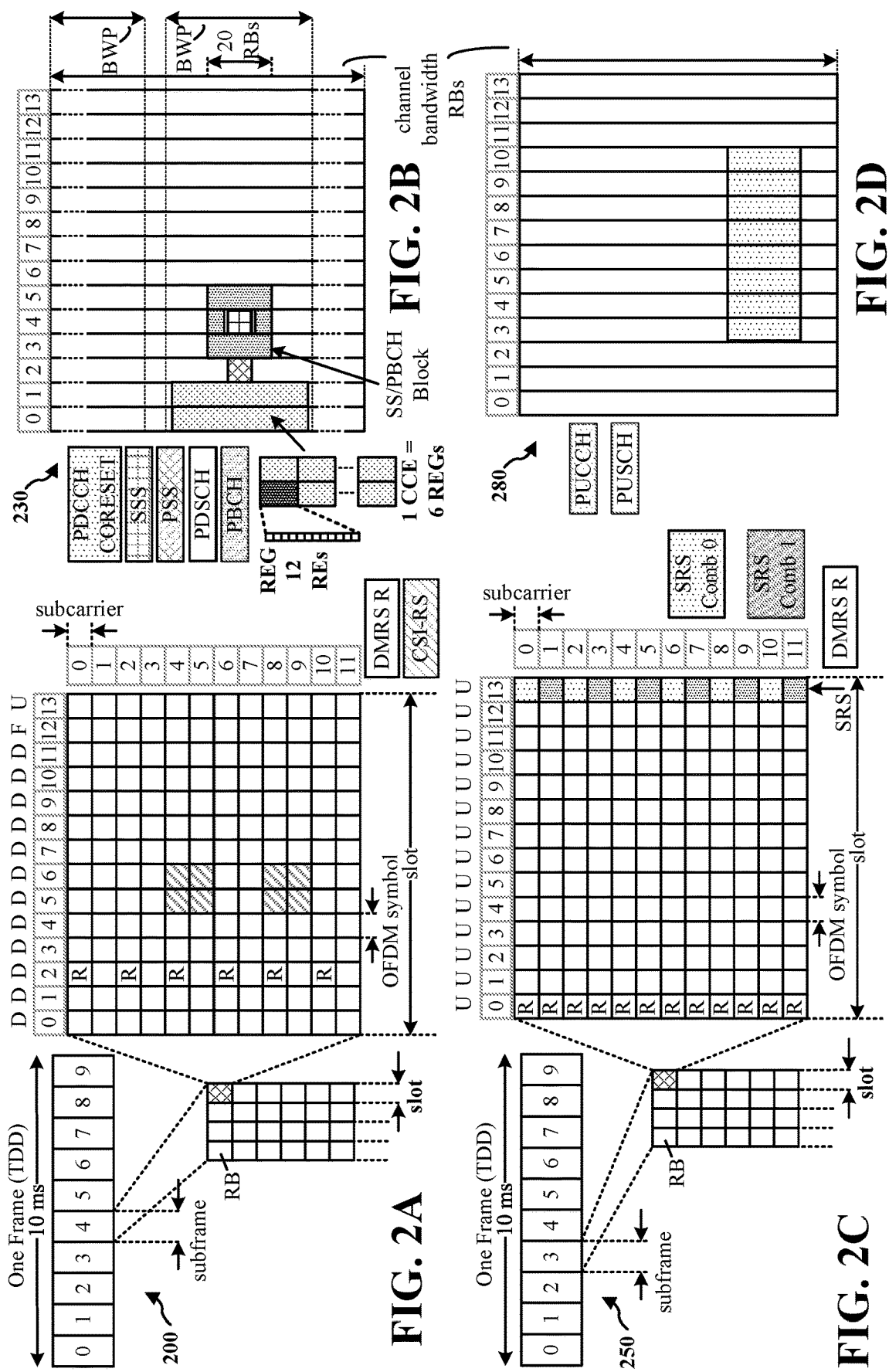
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
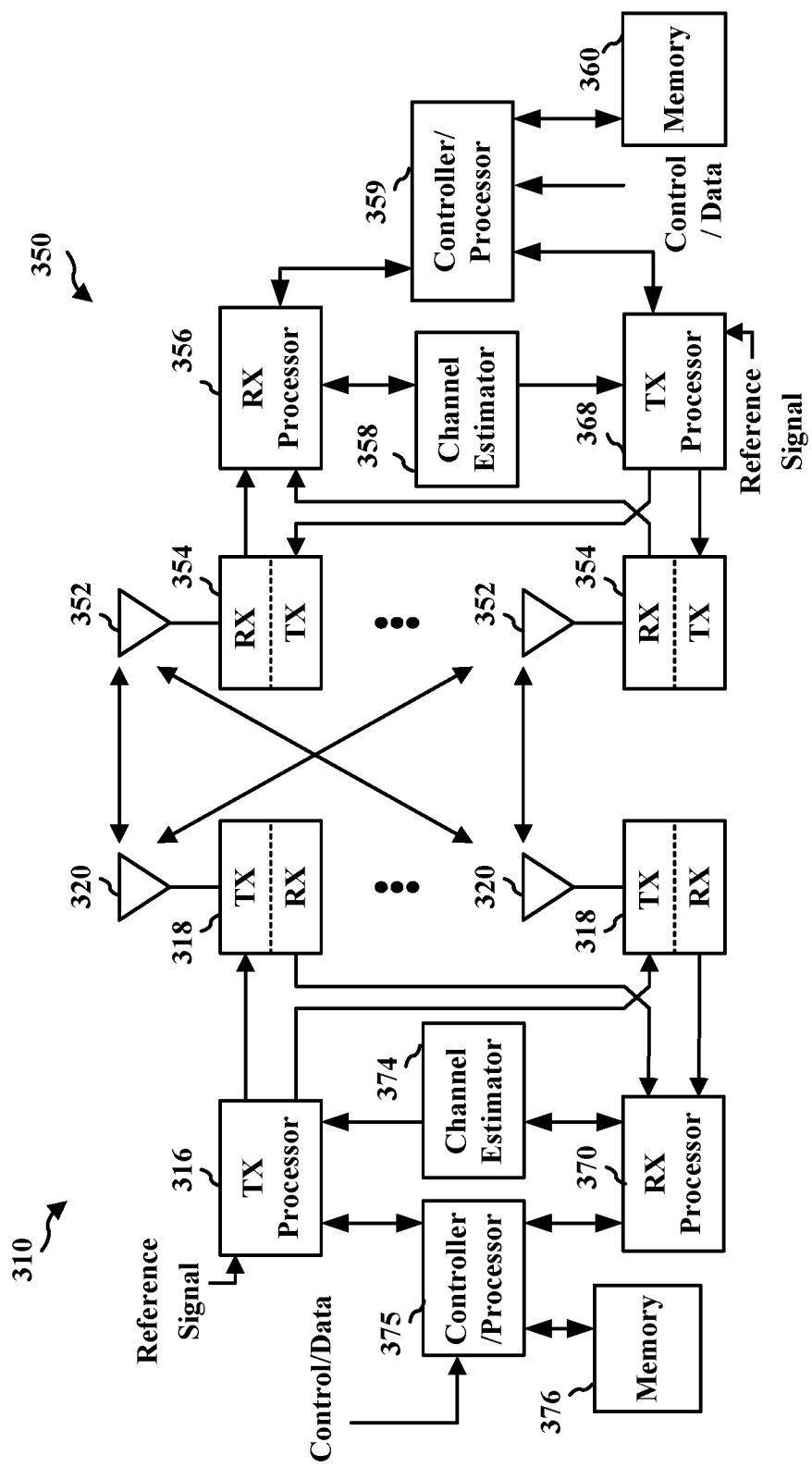
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter at RX/TX 318. Each transmitter at RX/TX 318 may modulate a radio frequency (RF) carrier with a respective spatial stream for transmission.

At the UE 350, each receiver at RX/TX 354 receives a signal through its respective antenna 352. Each receiver at RX/TX 354 recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters at RX/TX 354. Each transmitter at RX/TX 354 may modulate an RF carrier with a respective spatial stream for transmission.

The UL transmission is processed at the base station 310 in a manner similar to that described in connection with the receiver function at the UE 350. Each receiver at RX/TX 318 receives a signal through its respective antenna 320. Each receiver at RX/TX 318 recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

In some aspects of wireless communication, e.g., 5G NR, a small cell base station may be deployed to provide wireless coverage. The small cell base station, in some aspects supports one of FR1 (e.g., a sub-6 GHz band and/or protocol) or FR2 (e.g., a millimeter wave (mmWave) band and/or protocol). Aspects presented herein provide a flexible small cell base station and/or a flexible small cell base station architecture that supports both FR1 and FR2. In some aspects, the flexible small cell base station may support communication via both FR1 and FR2 simultaneously. Accordingly, the flexible small cell base station may provide a cost-effective solution to achieve the coverage of a first small cell base station supporting FR1 and the speed of a second small cell base station supporting FR2. Additionally, the flexible small cell base station may provide a seamless transition from FR1 to FR2 for a UE in communication with the flexible small cell base station.

Figure 4:
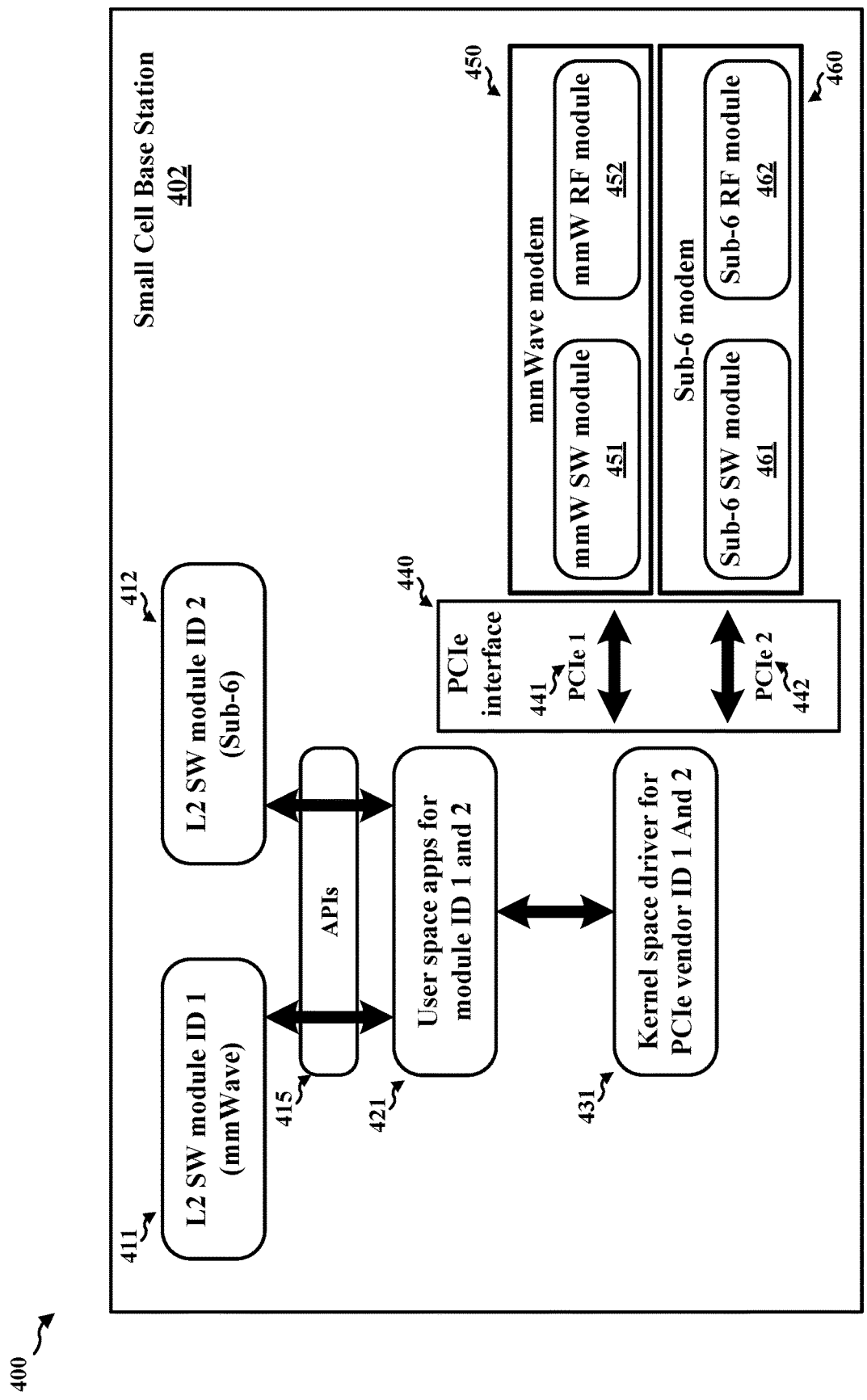
FIG. 4 is a diagram illustrates a flexible small cell base station.

FIG. 4 is a diagram 400 illustrates a flexible small cell base station 402. The flexible small cell base station 402 may include a mmWave modem 450 and a Sub-6 GHz modem 460 and a peripheral component interconnect express (PCIe) interface 440. The small cell base station may further include software components such as a first layer 2 (L2) (e.g., corresponding to layer 2 of the Open Systems Interconnection (OSI) model) software module for mmWave communication 411, a second L2 software module for Sub-6 GHz communication 412, a set of (shared) user-space applications (apps) 421 for the first L2 software module for mmWave communication 411 and the second L2 software module for Sub-6 GHz communication 412, and a kernel space driver 431 for a first PCIe vendor identifier (ID) and a second PCIe vendor ID.

The flexible small cell base station 402 may extract a PCIe vendor ID for each of the mmWave modem 450 and the Sub-6 GHz modem 460. The PCIe vendor ID for a particular modem (e.g., mmWave modem 450 or Sub-6 GHz modem 460) may be include a first portion identifying the PCIe vendor ID and a second portion identifying a particular interface (e.g., PCIe 1 441 or PCIe 2 442) of the PCIe interface 440. The PCIe vendor ID may be used to launch the user space apps 421 for the first L2 software module for mmWave communication 411 and the second L2 software module for Sub-6 GHz communication 412. The PCIe vendor ID, in some aspects, may be used to launch a kernel driver in the kernel space driver 431 for each of the mmWave modem 450 and the Sub-6 GHz modem 460.

The PCIe interface 440 may further include at least a first PCIe (e.g., PCIe 1 441) and a second PCIe (e.g., PCIe 2 442). In some aspects, PCIe 1 441 may be configured to connect to the mmWave modem 450 and the PCIe 2 442 may be configured connect to Sub-6 GHz modem 460. In some aspects, each of the PCIe interfaces (e.g., the PCIe 1 441 and the PCIe 2 442) may be configured by identifying at least one of (1) a protocol associated with the PCIe interface, a firmware associated with the PCIe interface, or a configuration associated with the PCIe interface based on an identifier associated with the PCIe interface. The mmWave modem 450 may include a mmWave software module 451 and a mmWave RF module 452 for providing layer 1 (PHY) processing for communication associated with the first L2 software module for mmWave communication 411 of the flexible small cell base station 402. The Sub-6 GHz modem 460 may include a Sub-6 GHz software module 461 and a Sub-6 GHz RF module 462 for providing layer 1 (PHY) processing for communication associated with the second L2 software module for Sub-6 GHz communication 412 of the flexible small cell base station 402.

Figure 5:
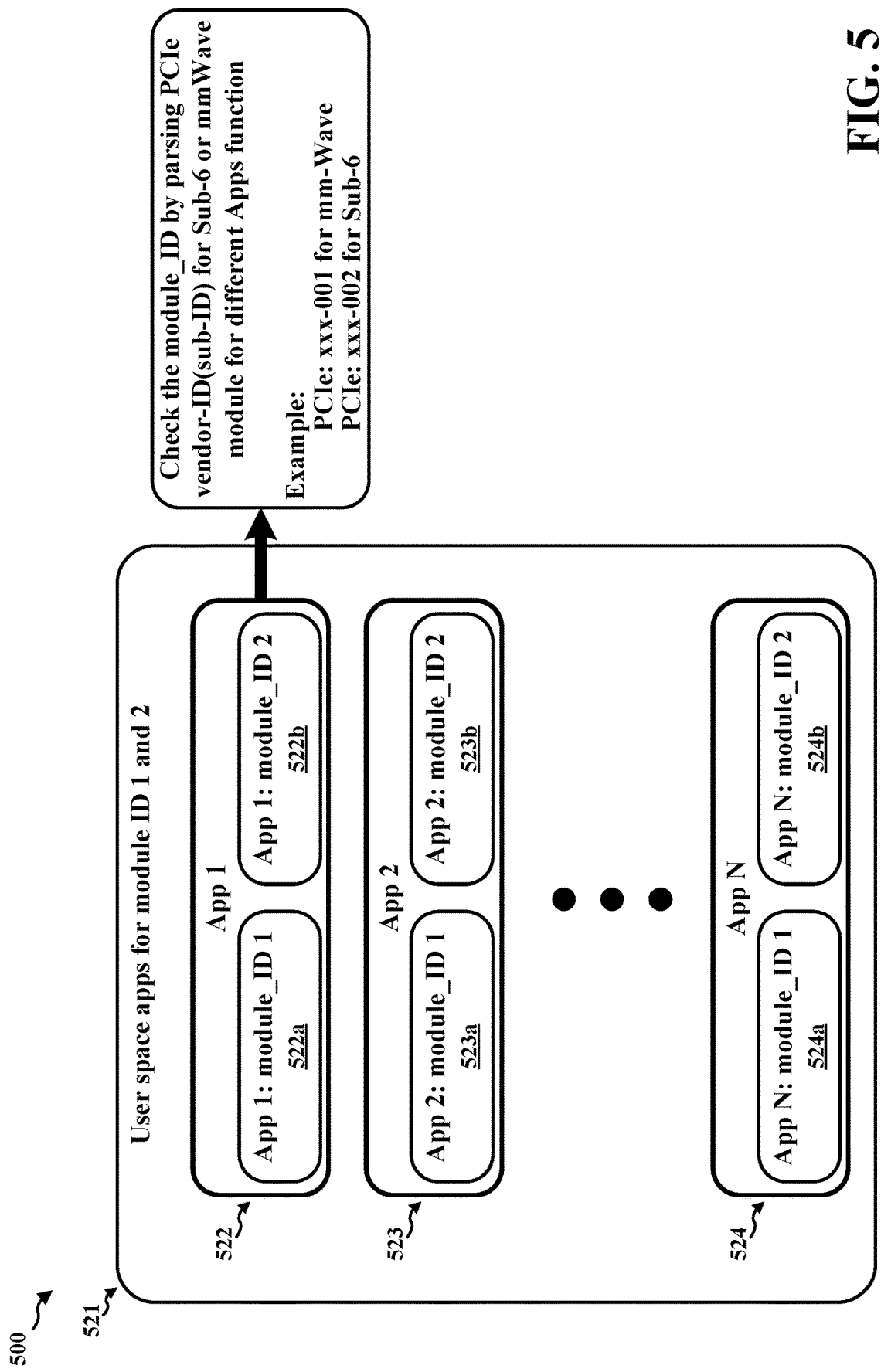
FIG. 5 is a diagram illustrating an example set of user space apps for a first L2 SW module for a first protocol with module ID 1 and a second L2 SW module for a second protocol with module ID 2.

FIG. 5 is a diagram 500 illustrating an example set of user space applications (apps) 521 for a first L2 software module for a first protocol with module ID 1 and a second L2 SW module for a second protocol with module ID 2. For example, referring to FIG. 4, the user space applications 421 may include a set of applications for the first L2 software module for mmWave communication 411 (e.g., with module ID 1) and the second L2 software module for Sub-6 GHz communication 412 (e.g., with module ID 2). User space applications 521 may include a set of N applications including application 522, application 523, and application 524. Each of the applications 522-524 may include a first version of the application (e.g., application 522a, 523a, or 524a) associated with a first module ID (e.g., module ID 1 or a PCIe vendor sub-ID, e.g., a PCIe vendor ID appended with a module ID 1) and a second version of the application (e.g., application 522b, 523b, or 524b) associated with a second module ID (e.g., module ID 2 or a PCIe vendor sub-ID, e.g., a PCIe vendor ID appended with a module ID 2). The different versions may be downloaded after identifying the first modem (e.g., mmWave modem 450) and the second modem (e.g., Sub-6 GHz modem 460). Upon receiving a communication from the kernel space driver or from one of the first L2 software module for mmWave communication 411 (e.g., with module ID 1) and the second L2 software module for Sub-6 GHz communication 412 (e.g., with module ID 2) the user space applications 521 may identify a set of applications (e.g., from applications 522-524) and the application version associated with the received communication for each application in the identified set of applications.

Figure 6:
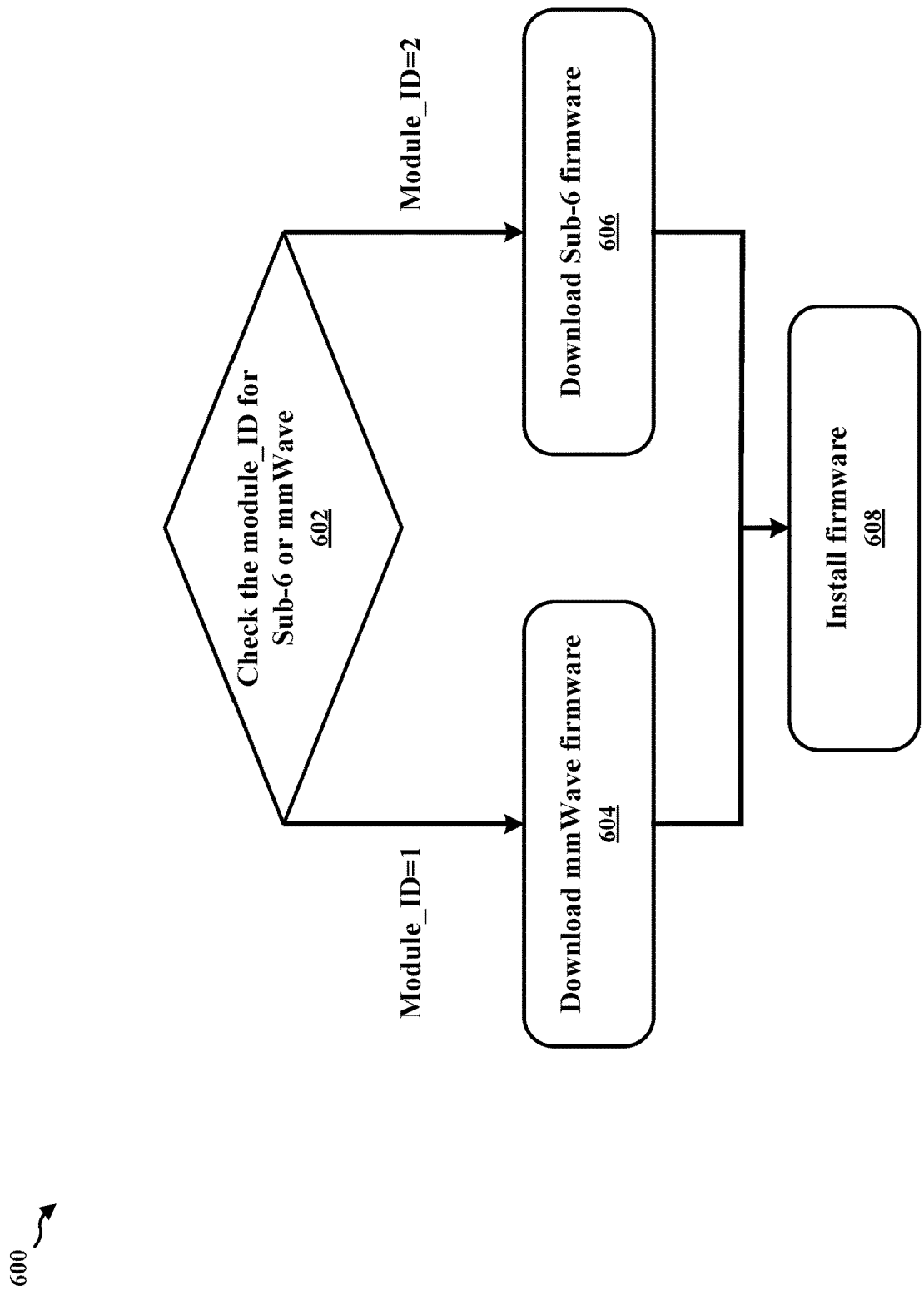
FIG. 6 is a flow diagram illustrating a method for configuring firmware of a flexible small cell base station.

FIG. 6 is a flow diagram 600 illustrating a method for configuring firmware of a flexible small cell base station. The method may be performed by a flexible small cell base station (e.g., flexible small cell base station 704 or 804). At 602, the flexible small cell base station may check a module ID associated with a modem. For example, 602 may be performed by configuration component 1240. Checking a module ID at 602 may be performed as part of a configuration operation as discussed below in relation to FIG. 7.

If the module ID associated with the modem is module ID 1, the flexible small cell base station, at 604, may download firmware for a mmWave modem. If the module ID associated with the modem is module ID 2, the flexible small cell base station, at 606, may download firmware for a Sub-6 GHz modem. After downloading the firmware at either 604 or 606, the flexible small cell base station may install, at 608, the downloaded firmware.

Figure 7:
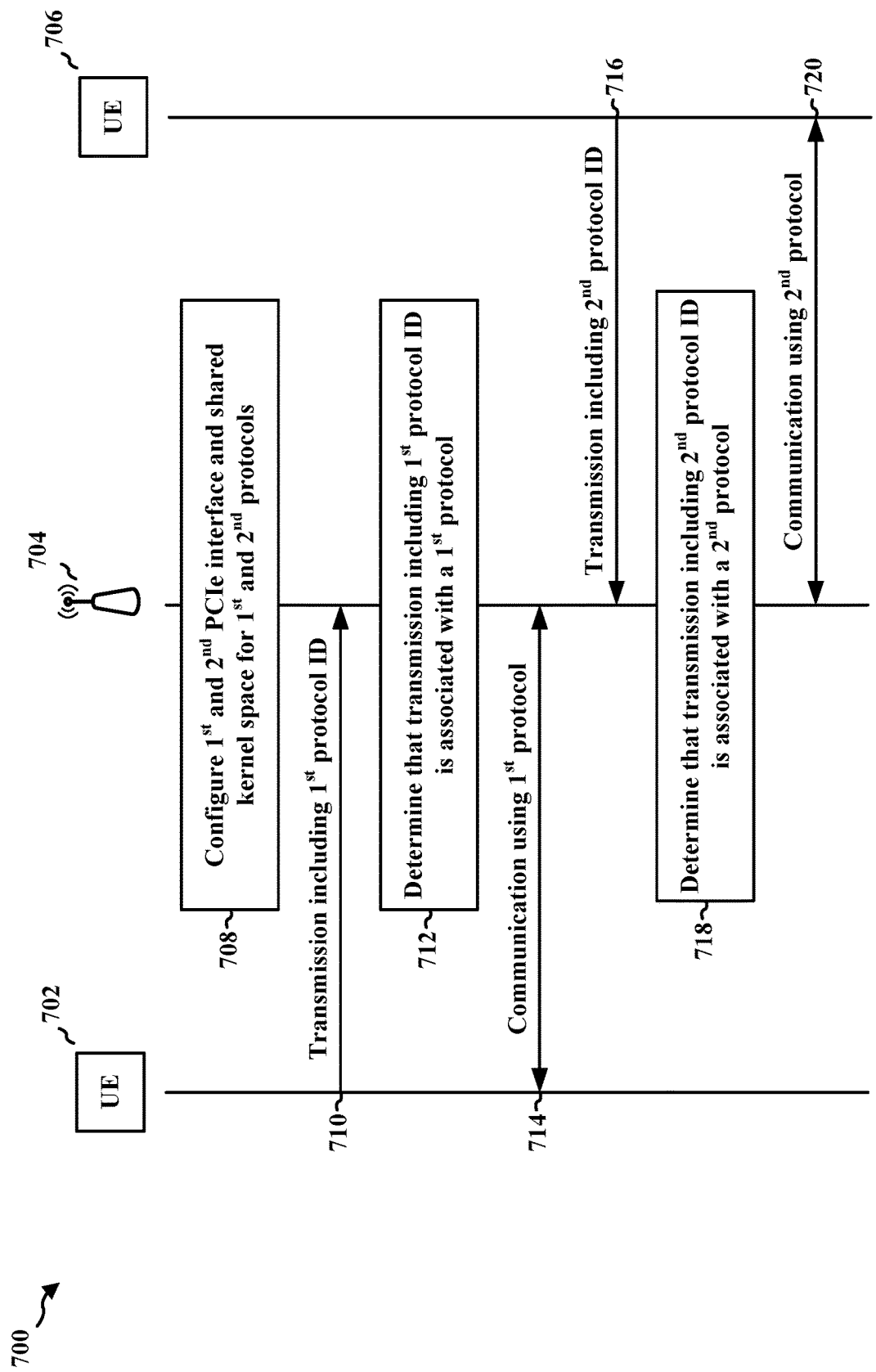
FIG. 7 is a diagram illustrating a communication between a flexible small cell base station and each of a first UE and a second UE.

FIG. 7 is a diagram 700 illustrating a communication between a flexible small cell base station 704 and each of a first UE 702 and a second UE 706. The flexible small cell base station 704 may configure 708, for a first and second modem (e.g., mmWave modem 450 and Sub-6 GHz modem 460) of the flexible small cell base station 704, a first and second PCIe interface respectively (e.g., PCIe 1 441 and PCIe 2 442), a shared kernel space (e.g., kernel space driver 431), and a shared user space (e.g., user space applications 421).

The first UE 702 may establish communication with the flexible small cell base station 704 via a mmWave (e.g., FR2) band based on a mmWave protocol. The flexible small cell base station 704 may support higher layer functionality, e.g., L2 functionality (e.g., MAC, RLC, PDCP), or layer 3 (L3) (e.g., RRC) processing. For example, the flexible small cell base station 704 may support L2 functionality via the first L2 software module for mmWave communication 411 and the second L2 software module for Sub-6 GHz communication 412. In establishing the communication, or after establishing the communication, the first UE 702 may transmit, and the flexible small cell base station 704 may receive, a transmission 710 including an indication of a first protocol identifier. In some aspects, the indication may include a characteristic of the transmission 710 such as a frequency band associated with the transmission 710 (e.g., indicating that the transmission is via a frequency in FR2) or a protocol identifier. The flexible small cell base station 704 may identify that the transmission 710 is associated with a first protocol and process the transmission with a set of higher layer (e.g., L3 and L2) modules associated with the first protocol. The L2 module (e.g., the first L2 software module for mmWave communication 411) of the flexible small cell base station 704 may communicate with one or more user space applications (e.g., user space applications 421) via an application programming interface (API). The communication between the L2 module and the user space applications may include the first protocol identifier in an API.

Based on the first protocol identifier, the user space applications may pass information associated with the transmission 710 (including the first protocol identifier) to a kernel space driver (e.g., kernel space driver 431) and the flexible small cell base station 704 may determine 712 that the transmission 710 is associated with the first protocol (e.g., a mmWave protocol) based on the first identifier. Each of the user space applications and the kernel space driver may determine 712 that the transmission 710 is associated with the first protocol. Based on the determination, the flexible small cell base station 704 may transmit data (e.g., transport blocks) associated with the transmission 710 over a first PCIe interface (e.g., PCIe 1 441) to a first modem (e.g., mmWave modem 450) associated with the first protocol. Additional data may be exchanged via a set of communications 714 using the first protocol (using the first modem and the first PCIe interface).

Similarly, the second UE 706 may establish communication with the flexible small cell base station 704 via a Sub-6 GHz (e.g., FR1) band based on a Sub-6 GHz protocol. In establishing the communication, or after establishing the communication, the second UE 706 may transmit, and the flexible small cell base station 704 may receive, a transmission 716 including an indication of a second protocol identifier. In some aspects, the indication may include a characteristic of the transmission 716 such as a frequency band associated with the transmission 716 (e.g., indicating that the transmission is via a frequency in FR1) or a protocol identifier. The flexible small cell base station 704 may identify that the transmission 716 is associated with the second protocol and process the transmission with a set of higher layer (e.g., L3 and L2) modules associated with the second protocol. The L2 module (e.g., the second L2 software module for Sub-6 GHz communication 412) of the flexible small cell base station 704 may communicate with one or more user space applications (e.g., user space applications 421) via an API. The communication between the L2 module and the user space applications may include the second protocol identifier in an API.

Based on the second protocol identifier, the user space applications may pass information associated with the transmission 716 (including the second protocol identifier) to a kernel space driver (e.g., kernel space driver 431) and the flexible small cell base station 704 may determine 718 that the transmission 716 is associated with the second protocol (e.g., a Sub-6 GHz protocol) based on the second identifier. Each of the user space applications and the kernel space driver may determine 718 that the transmission 716 is associated with the second protocol. Based on the determination, the flexible small cell base station 704 may transmit data (e.g., transport blocks) associated with the transmission 716 over a second PCIe interface (e.g., PCIe 2 442) to a second modem (e.g., Sub-6 GHz modem 460) associated with the second protocol. Additional data may be exchanged via a set of communications 720 using the second protocol (using the second modem and the second PCIe interface).

Figure 8:
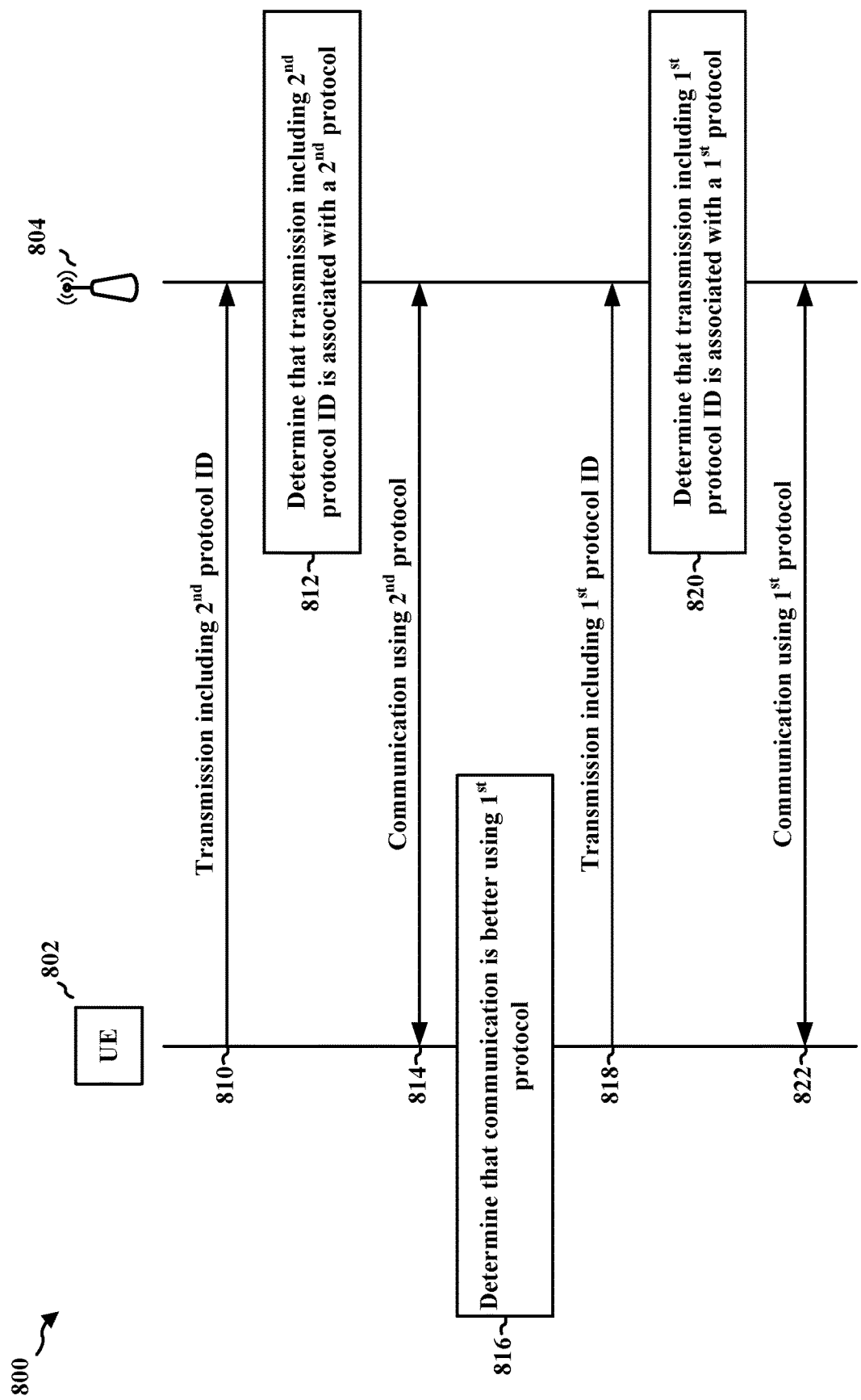
FIG. 8 is a diagram illustrating a communication between a flexible small cell base station and a UE moving from a FR1 coverage area to a FR2 coverage area of the flexible small cell base station.

FIG. 8 is a diagram 800 illustrating a communication between a flexible small cell base station 804 and a UE 802 moving from a FR1 coverage area to a FR2 coverage area of the flexible small cell base station 804. FIG. 8 assumes that the flexible small cell base station 804 has already configured a first and second PCIe interface and a shared kernel space for a first and second protocol as described above in relation to FIG. 7. The UE 802 may establish communication with the flexible small cell base station 804 via a Sub-6 GHz (e.g., FR1) band based on a Sub-6 GHz protocol. In establishing the communication, or after establishing the communication, the UE 802 may transmit, and the flexible small cell base station 804 may receive, a transmission 810 including an indication of a second protocol identifier. In some aspects, the indication may include a characteristic of the transmission 810 such as a frequency band associated with the transmission 810 (e.g., indicating that the transmission is via a frequency in FR1) or a protocol identifier. The flexible small cell base station 804 may identify that the transmission 810 is associated with the second protocol and process the transmission with a set of higher layer (e.g., L3 and L2) modules associated with the second protocol. The L2 module (e.g., the second L2 software module for Sub-6 GHz communication 412) of the flexible small cell base station 804 may communicate with one or more user space applications (e.g., user space applications 421) via an API. The communication between the L2 module and the user space applications may include the second protocol identifier in an API.

Based on the second protocol identifier, the user space applications may pass information associated with the transmission 810 (including the second protocol identifier) to a kernel space driver (e.g., kernel space driver 431) and the flexible small cell base station 804 may determine 812 that the transmission 810 is associated with the second protocol (e.g., a Sub-6 GHz protocol) based on the second identifier. Each of the user space applications and the kernel space driver may determine 812 that the transmission 810 is associated with the second protocol. Based on the determination, the flexible small cell base station 804 may transmit data (e.g., transport blocks) associated with the transmission 810 over a second PCIe interface (e.g., PCIe 2 442) to a second modem (e.g., Sub-6 GHz modem 460) associated with the second protocol. Additional data may be exchanged via a set of communications 814 using the second protocol (using the second modem and the second PCIe interface).

Figure 9:
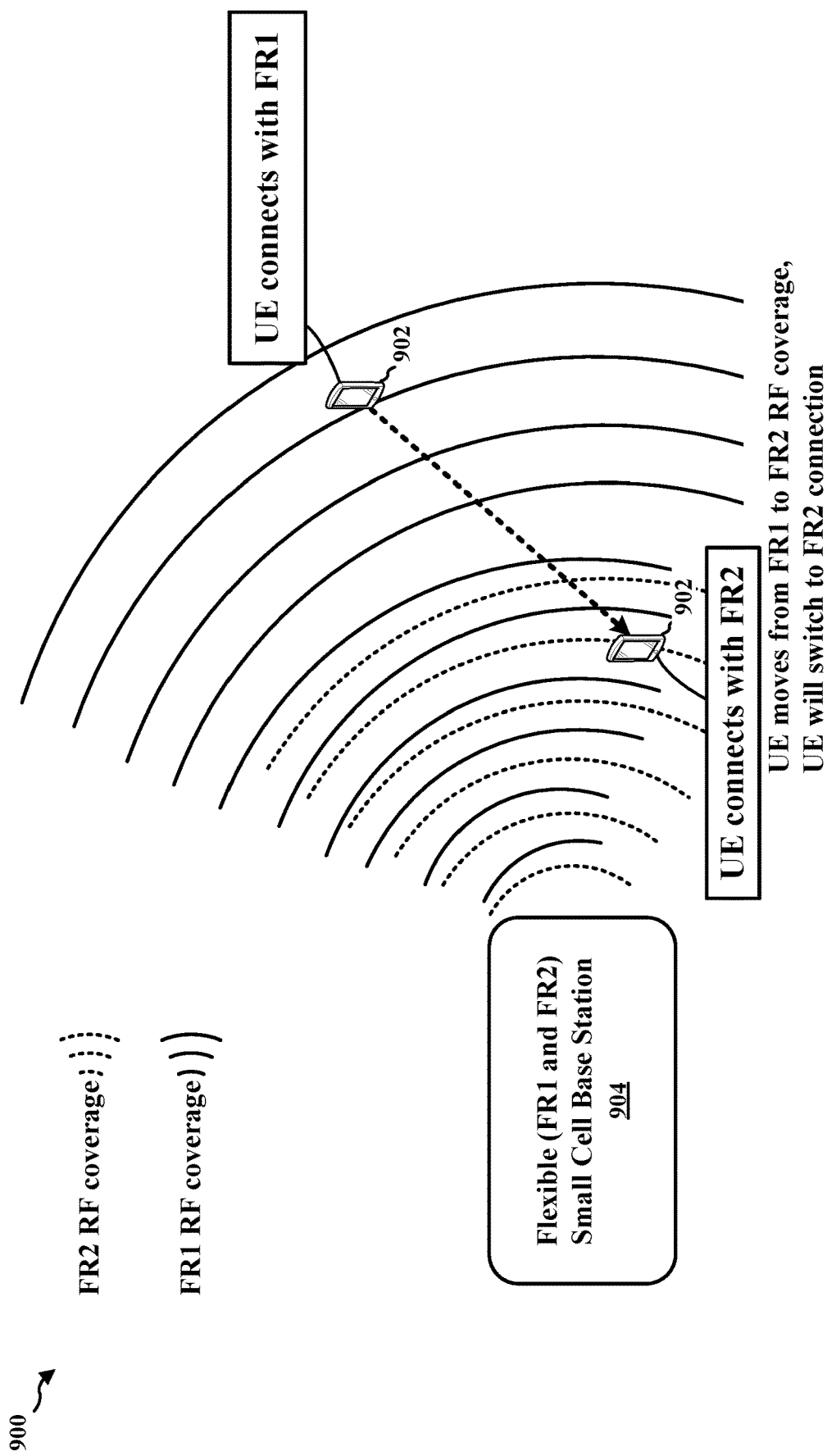
FIG. 9 is a diagram illustrating a UE moving from a first location associated with a FR1 coverage area to a second location associated with both a FR1 coverage area and a FR2 coverage area.

The UE 802 may determine 816 that the communication with the flexible small cell base station 804 may be better via the first protocol (e.g., via the mmWave modem 450). The communication may be better via the second protocol in a first location that is farther from the flexible small cell base station 804 (e.g., that is in a coverage area of the second protocol but not the first protocol) while the communication may be better via the first protocol in a second location that is closer to the flexible small cell base station 804 (e.g., that is in a coverage area of the first protocol and the second protocol). The determination may be based on the UE 802 moving from the first location to the second location. FIG. 9 is a diagram 900 illustrating a UE 902 moving from a first location associated with a FR1 coverage area of a flexible small cell base station 904 to a second location associated with both a FR1 coverage area and a FR2 coverage area of a flexible small cell base station 904.

As illustrated in FIG. 9, based on the determination that the communication with the flexible small cell base station 804 may be better via the first protocol, the UE 802 may transmit, and the flexible small cell base station 804 may receive, a transmission 818 including an indication of a first protocol identifier. In some aspects, the indication may include a characteristic of the transmission 818 such as a frequency band associated with the transmission 818 (e.g., indicating that the transmission is via a frequency in FR2) or a protocol identifier. The flexible small cell base station 804 may identify that the transmission 818 is associated with a first protocol and process the transmission with a set of higher layer (e.g., L3 and L2) modules associated with the first protocol. The L2 module (e.g., the first L2 software module for mmWave communication 411) of the flexible small cell base station 804 may communicate with one or more user space applications (e.g., user space applications 421) via a set of APIs 415. The communication between the L2 module and the user space applications may include the first protocol identifier in an API call via the set of APIs 415.

Based on the first protocol identifier, the user space applications may pass information associated with the transmission 818 (including the first protocol identifier) to a kernel space driver (e.g., kernel space driver 431) and the flexible small cell base station 804 may determine 820 that the transmission 818 is associated with the first protocol (e.g., a mmWave protocol) based on the first identifier. Each of the user space applications and the kernel space driver may determine 820 that the transmission 818 is associated with the first protocol. Based on the determination, the flexible small cell base station 804 may transmit data (e.g., transport blocks) associated with the transmission 818 over a first PCIe interface (e.g., PCIe 1 441) to a first modem (e.g., mmWave modem 450) associated with the first protocol. Additional data may be exchanged via a set of communications 822 using the first protocol (using the first modem and the first PCIe interface).

Figure 10:
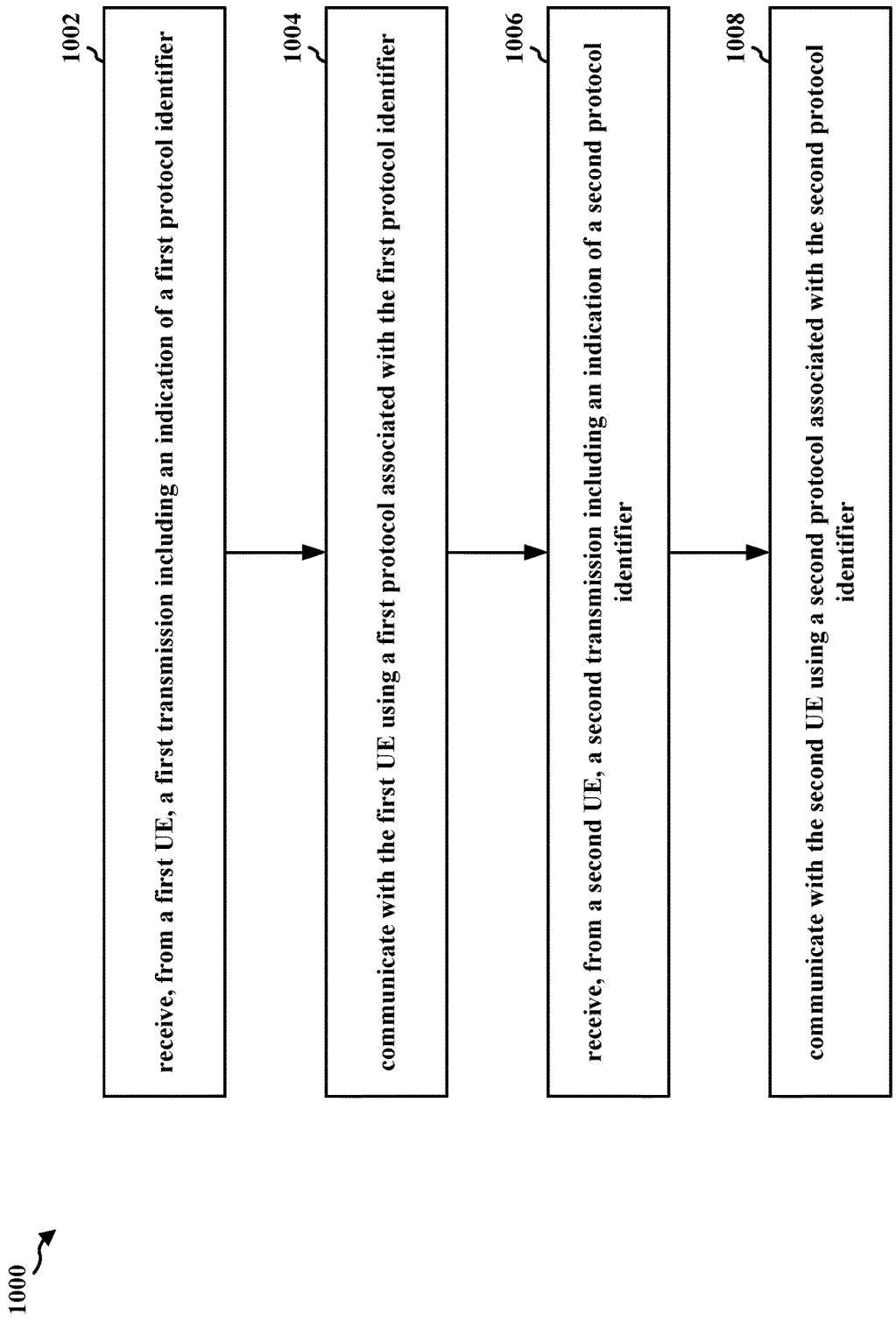
FIG. 10 is a flowchart of a method of wireless communication.

FIG. 10 is a flowchart 1000 of a method of wireless communication. The method may be performed by a network node such as a network node associated with a small cell base station (e.g., the base station 102/180; the flexible small cell base station 402, 704, and 804; the apparatus 1202). At 1002, the small cell base station may receive, from a first UE, a first transmission including a first protocol identifier. For example, 1002 may be performed by a module ID determination component 1242. The first protocol, in some aspects, may be a mmWave protocol associated with a mmWave modem of the small cell base station. For example, referring to FIGS. 7 and 8, the flexible small cell base station 704 and/or 804 may receive a transmission 710 and/or a transmission 818 including an indication of a first protocol identifier.

The small cell base station may have previously configured a first PCIe interface for communicating with a first modem associated with the first protocol. Configuring the first PCIe interface, in some aspects, may include identifying at least one of (1) the first protocol associated with the first PCIe interface (2) first firmware associated with the first PCIe interface, or (3) a first configuration associated with the first PCIe interface based on a first identifier associated with the first PCIe interface. In some aspects, configuring the first PCIe interface may include identifying a vendor ID associated with the first PCIe interface and/or a vendor sub-ID (e.g., a PCIe vendor ID appended with an additional ID associated with the first interface of the PCIe interface). The small cell base station may also have configured a second PCIe interface for communicating with a second modem associated with the second protocol. Configuring the second PCIe interface, in some aspects, may include identifying at least one of (1) the second protocol associated with the second PCIe interface (2) second firmware associated with the second PCIe interface, or (3) a second configuration associated with the second PCIe interface based on a second identifier associated with the second PCIe interface. In some aspects, configuring the second PCIe interface may include identifying a vendor ID associated with the second PCIe interface and/or a vendor sub-ID (e.g., a PCIe vendor ID appended with an additional ID associated with the second interface of the PCIe interface).

In some aspects, the small cell base station may have previously configured a shared kernel space for communicating with the first PCIe interface and the second PCIe interface. The shared kernel space, in some aspects, may be configured to identify whether a communication received from at least one UE is associated with the first PCIe interface or the second PCIe interface. The small cell base station may also have configured a set of user space applications including applications for each of the first protocol and the second protocol. The user space may further be configured to identify whether a communication received from at least one UE is associated with the first protocol or the second protocol. In some aspects, the user space may include and/or provide at least one API that is used to communicate with a set of L2 components for each of the first protocol and the second protocol.

The user space and/or the kernel space may determine that the transmission received at 1002 is associated with the first protocol. The determination may be based on the indication included in the transmission received at 1002. The indication may be a characteristic of the transmission received at 1002 such as a frequency band associated with the transmission (e.g., indicating that the transmission is via a frequency in FR2) or a protocol identifier.

At 1004, the small cell base station may communicate with the first UE using a first protocol associated with the first protocol identifier. For example, 1004 may be performed by module ID-based communication component 1244. The communication at 1004 may be exchanged via a first modem associated with the first protocol based on identifying the first protocol as being associated with the first UE based on the second transmission including the indication of the first protocol identifier at 1002. For example, referring to FIGS. 4, 7, and 8, a flexible small cell base station 402, 704, or 804, may communicate with the first UE 702 or the UE 802 via a mmWave modem 450 using a first protocol associated with the mmWave modem.

At 1006, the small cell base station may receive, from a second UE, a second transmission including a second protocol identifier. For example, 1006 may be performed by a module ID determination component 1242. The second protocol, in some aspects, may be a Sub-6 GHz protocol associated with a Sub-6 GHz modem of the small cell base station. For example, referring to FIGS. 7 and 8, the flexible small cell base station 704 and/or 804 may receive a transmission 716 and/or a transmission 810 including an indication of a second protocol identifier.

The user space and/or the kernel space may determine that the transmission received at 1006 is associated with the second protocol. The determination may be based on the indication included in the transmission received at 1006. The indication may be a characteristic of the transmission received at 1006 such as a frequency band associated with the transmission (e.g., indicating that the transmission is via a frequency in FR1) or a protocol identifier.

At 1008, the small cell base station may communicate with the second UE using a second protocol associated with the second protocol identifier. For example, 1008 may be performed by module ID-based communication component 1244. The communication at 1008 may be exchanged via a second modem associated with the second protocol based on an identifying the second protocol as being associated with the second UE based on the second transmission including the indication of the second protocol identifier at 1006. For example, referring to FIGS. 4, 7, and 8, a flexible small cell base station 402, 704, or 804, may communicate with the second UE 706 or the UE 802 via a Sub-6 GHz modem 460 using a second protocol associated with the Sub-6 GHz modem.

Figure 11:
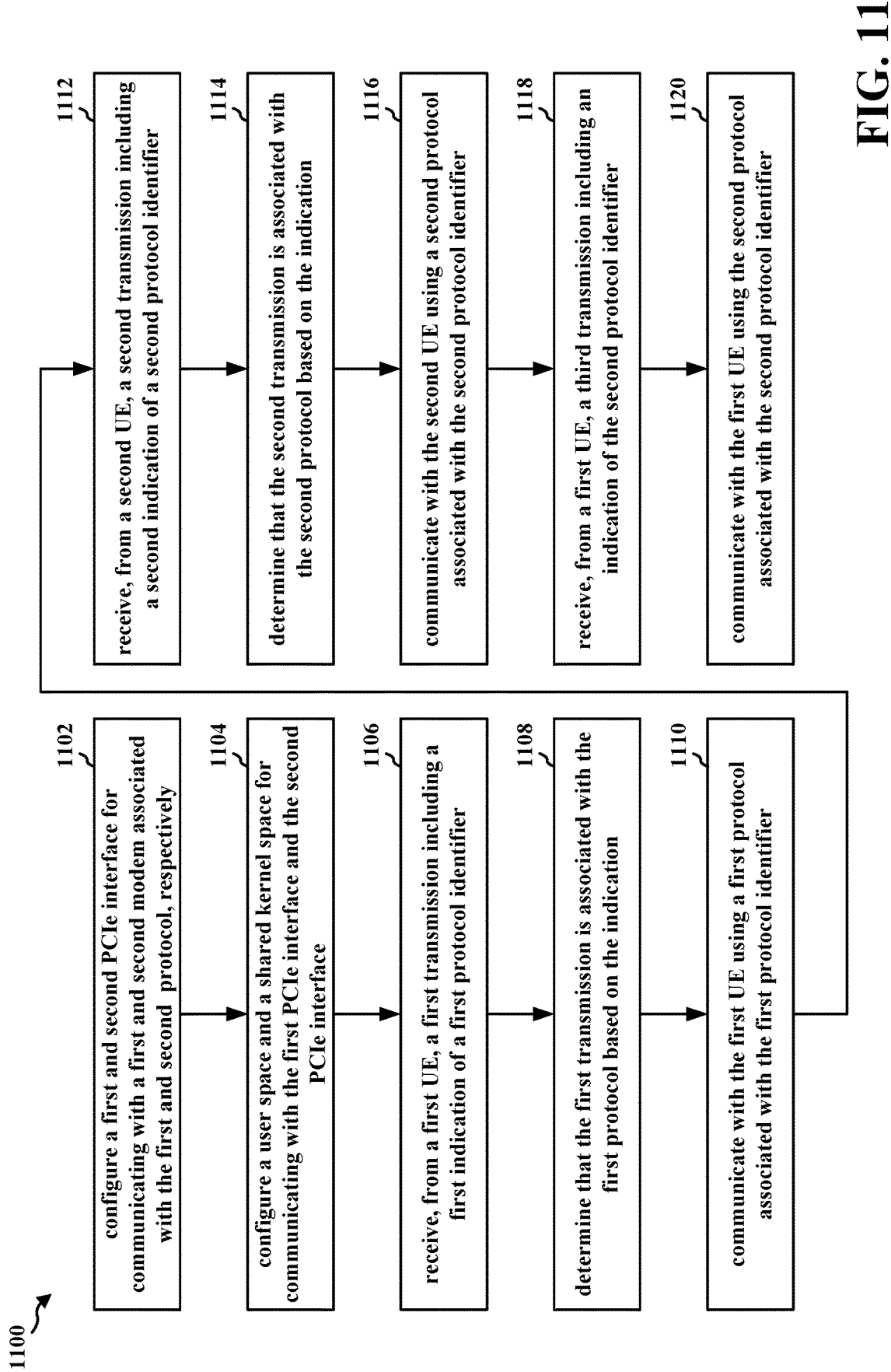
FIG. 11 is a flowchart of a method of wireless communication.

FIG. 11 is a flowchart 1100 of a method of wireless communication. The method may be performed by a network node such as a network node associated with a small cell base station (e.g., the base station 102/180; the flexible small cell base station 402, 704, and 804; the apparatus 1202). At 1102, the small cell base station may configure a first PCIe interface for communicating with a first modem associated with the first protocol and may configure a second PCIe interface for communicating with a second modem associated with the second protocol. For example, 1102 may be performed by configuration component 1240. Configuring, at 1102, the first PCIe interface, in some aspects, includes identifying at least one of (1) the first protocol associated with the first PCIe interface (2) first firmware associated with the first PCIe interface, or (3) a first configuration associated with the first PCIe interface based on a first identifier associated with the first PCIe interface. In some aspects, configuring the first PCIe interface may include identifying a vendor ID associated with the first PCIe interface and/or a vendor sub-ID (e.g., a PCIe vendor ID appended with an additional ID associated with the first interface of the PCIe interface). Configuring the second PCIe interface, in some aspects, includes identifying at least one of (1) the second protocol associated with the second PCIe interface (2) second firmware associated with the second PCIe interface, or (3) a second configuration associated with the second PCIe interface based on a second identifier associated with the second PCIe interface. In some aspects, configuring the second PCIe interface may include identifying a vendor ID associated with the second PCIe interface and/or a vendor sub-ID (e.g., a PCIe vendor ID appended with an additional ID associated with the second interface of the PCIe interface). For example, referring to FIGS. 4 and 7, the flexible small cell base station 704 may configure 708, for a first and second modem (e.g., mmWave modem 450 and Sub-6 GHz modem 460) of the flexible small cell base station 704, a first and second PCIe interface respectively (e.g., PCIe 1 441 and PCIe 2 442).

At 1104, the small cell base station may configure a shared kernel space for communicating with the first PCIe interface and the second PCIe interface. The small cell base station, at 1104, may configure a user space with a first set of applications associated with the first protocol and a second set of applications associated with the second protocol. For example, 1104 may be performed by configuration component 1240. The shared kernel space, in some aspects, may be configured, at 1104, to identify whether a communication received from at least one UE is associated with the first PCIe interface or the second PCIe interface. The small cell base station may also have configured a set of user space applications including applications for each of the first protocol and the second protocol. The user space may further be configured to identify whether a communication received from at least one UE is associated with the first protocol or the second protocol. In some aspects, the user space may include at least one API that is used to communicate with a set of L2 components for each of the first protocol and the second protocol. For example, referring to FIGS. 4 and 7, the flexible small cell base station 704 may configure 708 a shared kernel space (e.g., kernel space driver 431).

At 1106, the small cell base station may receive, from a first UE, a first transmission including an indication of a first protocol identifier. For example, 1106 may be performed by a module ID determination component 1242. The first protocol, in some aspects, may be a mmWave protocol associated with a mmWave modem of the small cell base station. For example, referring to FIGS. 7 and 8, the flexible small cell base station 704 and/or 804 may receive a transmission 710 and/or a transmission 818 including an indication of a first protocol identifier.

At 1108, the small cell base station (e.g., the user space and/or the kernel space of the small cell base station) may determine that the transmission received at 1106 is associated with the first protocol. For example, 1108 may be performed by module ID determination component 1242. The determination may be based on the indication included in the transmission received at 1106. The indication may be a characteristic of the transmission received at 1106 such as a frequency band associated with the transmission (e.g., indicating that the transmission is via a frequency in FR2) or a protocol identifier. For example, referring to FIGS. 7 and 8, the flexible small cell base station 704 or 804 may determine 712 or 820 that a transmission 710 or 818 is associated with the first protocol.

At 1110, the small cell base station may communicate with the first UE using a first protocol associated with the first protocol identifier. For example, 1110 may be performed by module ID-based communication component 1244. The communication at 1110 may be exchanged via a first modem associated with the first protocol based on identifying the first protocol as being associated with the first UE based on the second transmission including the indication of the first protocol identifier at 1106. For example, referring to FIGS. 4, 7, and 8, a flexible small cell base station 402, 704, or 804, may communicate with the first UE 702 or the UE 802 via a mmWave modem 450 using a first protocol associated with the mmWave modem.

At 1112, the small cell base station may receive, from a second UE, a second transmission including an indication of a second protocol identifier. For example, 1112 may be performed by a module ID determination component 1242. The second protocol, in some aspects, may be a Sub-6 GHz protocol associated with a Sub-6 GHz modem of the small cell base station. For example, referring to FIGS. 7 and 8, the flexible small cell base station 704 and/or 804 may receive a transmission 716 and/or a transmission 810 including an indication of a second protocol identifier.

At 1114, the small cell base station (e.g., the user space and/or the kernel space of the small cell base station) may determine that the transmission received at 1112 is associated with the second protocol. For example, 1114 may be performed by module ID determination component 1242. The determination may be based on the indication included in the transmission received at 1112. The indication may be a characteristic of the transmission received at 1112 such as a frequency band associated with the transmission (e.g., indicating that the transmission is via a frequency in FR1) or a protocol identifier. For example, referring to FIGS. 7 and 8, the flexible small cell base station 704 or 804 may determine 718 or 812 that a transmission 716 or 810 is associated with the first protocol.

At 1116, the small cell base station may communicate with the second UE using a second protocol associated with the second protocol identifier. For example, 1116 may be performed by module ID-based communication component 1244. The communication at 1110 may be exchanged via a second modem associated with the second protocol based on an identifying the second protocol as being associated with the second UE based on the second transmission including the indication of the second protocol identifier at 1112. For example, referring to FIGS. 4, 7, and 8, a flexible small cell base station 402, 704, or 804, may communicate with the second UE 706 or the UE 802 via a Sub-6 GHz modem 460 using a second protocol associated with the Sub-6 GHz modem.

At 1118, the small cell base station may receive, from the first UE, a third transmission including an indication of the second protocol identifier. For example, 1118 may be performed by a module ID determination component 1242. The second protocol, in some aspects, may be a Sub-6 GHz protocol associated with a Sub-6 GHz modem of the small cell base station. For example, referring to FIG. 8, the flexible small cell base station or 804 may receive a transmission 818 including an indication of the second protocol identifier.

The small cell base station (e.g., the user space and/or the kernel space of the small cell base station) may determine that the transmission received at 1118 is associated with the second protocol. The determination may be based on the indication included in the transmission received at 1118. The indication may be a characteristic of the transmission received at 1118 such as a frequency band associated with the transmission (e.g., indicating that the transmission is via a frequency in FR1) or a protocol identifier.

At 1120, the small cell base station may communicate with the first UE using the second protocol associated with the second protocol identifier. For example, 1120 may be performed by module ID-based communication component 1244. The communication at 1120 may be exchanged via a second modem associated with the second protocol based on an identifying the second protocol as being associated with the first UE based on the third transmission including the indication of the second protocol identifier at 1118. For example, referring to FIGS. 4 and 8, a flexible small cell base station 402 or 804 may communicate with the UE 802 via a Sub-6 GHz modem 460 using a second protocol associated with the Sub-6 GHz modem.

Figure 12:
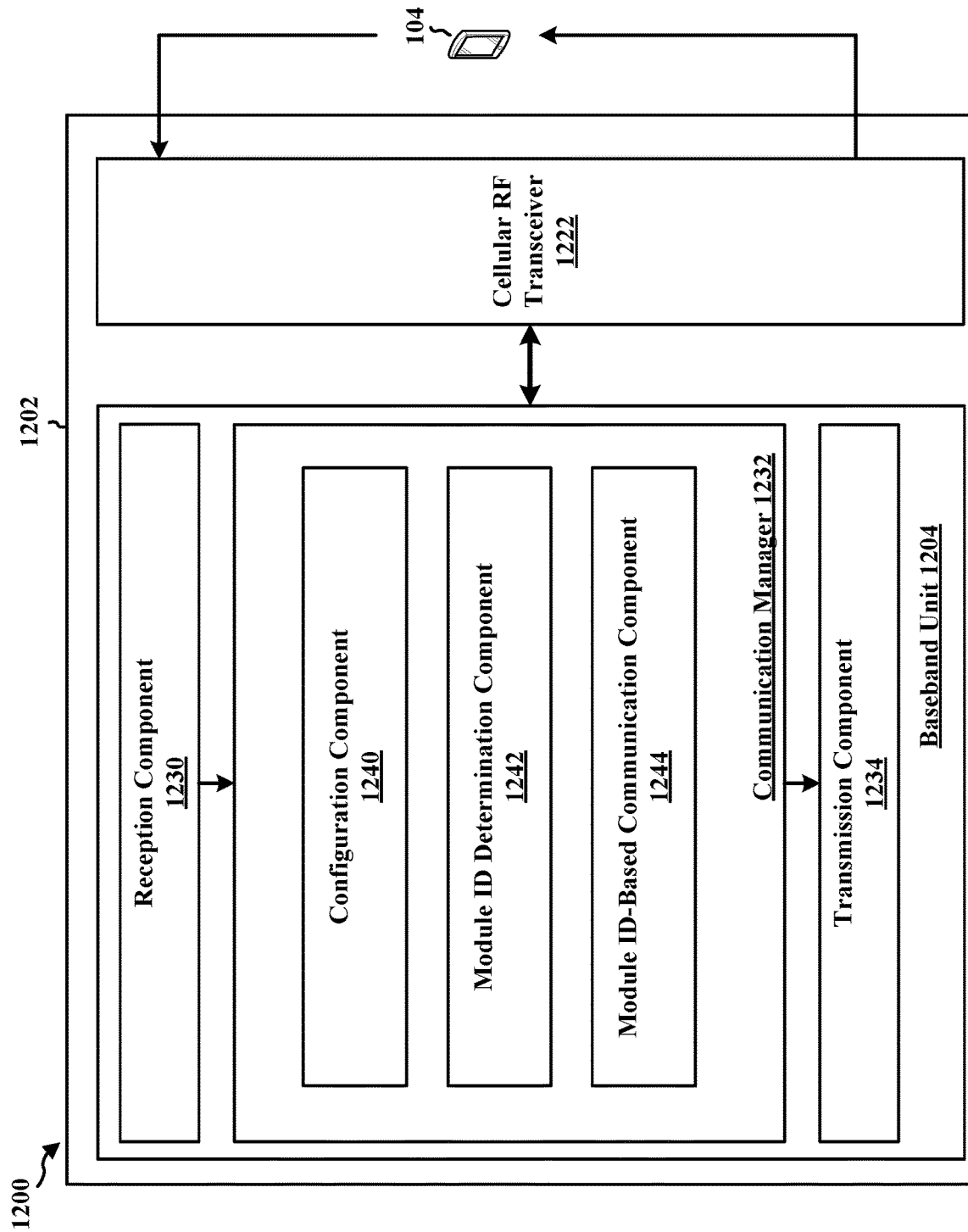
FIG. 12 is a diagram illustrating an example of a hardware implementation for an apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a configuration component 1240 that may be configured to check a module ID associated with a modem, download firmware for a mmWave modem, download firmware for a Sub-6 GHz modem, install the downloaded firmware, configure a first PCIe interface for communicating with a first modem associated with the first protocol and to configure a second PCIe interface for communicating with a second modem associated with the second protocol, configure a user space with a first set of applications associated with the first protocol and a second set of applications associated with the second protocol, and configure a shared kernel space for communicating with the first PCIe interface and the second PCIe interface, e.g., as described in connection with 602, 604, 606, 608, and 1102 of FIGS. 6 and 11. The communication manager 1232 further includes a module ID determination component 1242 that may be configured to receive, from a first UE, a first transmission including an indication of a first protocol identifier, determine that the first transmission is associated with the first protocol receive, from a second UE, a second transmission including an indication of a second protocol identifier, determine that the second transmission is associated with the second protocol, and receive, from the first UE, a third transmission including an indication of the second protocol identifier, e.g., as described in connection with 1002, 1006, 1106, 1108, 1112, 1114, and 1118 of FIGS. 10 and 11. The communication manager 1232 further includes a module ID-based communication component 1244 that may be configured to communicate with the first UE using a first protocol associated with the first protocol identifier, communicate with the second UE using a second protocol associated with the second protocol identifier, communicate with the first UE using the second protocol associated with the second protocol identifier, e.g., as described in connection with 1004, 1008, 1110, 1116, and 1120 of FIGS. 10 and 11.

The apparatus may include additional components that perform each of the blocks of the algorithm in the flowcharts of FIGS. 6, 10, and 11. As such, each block in the flowcharts of FIGS. 6, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from a first UE, a first transmission including an indication of a first protocol identifier. The apparatus 1202, and in particular the baseband unit 1204, includes means for communicating with the first UE using a first protocol associated with the first protocol identifier. The apparatus 1202, and in particular the baseband unit 1204, includes means for receiving, from a second UE, a second transmission including an indication of a second protocol identifier. The apparatus 1202, and in particular the baseband unit 1204, includes means for communicating with the second UE using a second protocol associated with the second protocol identifier. The apparatus 1202, and in particular the baseband unit 1204, includes means for configuring a first PCIe interface for communicating with a first modem associated with the first protocol. The apparatus 1202, and in particular the baseband unit 1204, includes means for configuring a second PCIe interface for communicating with a second modem associated with the second protocol. The apparatus 1202, and in particular the baseband unit 1204, includes means for configuring a shared kernel space for communicating with the first PCIe interface and the second PCIe interface. The apparatus 1202, and in particular the baseband unit 1204, includes means for receiving, from the first UE, a third transmission including the second protocol identifier, where the first UE determines that a communication using the second protocol is better than the communication using the first protocol. The apparatus 1202, and in particular the baseband unit 1204, includes means for communicating with the first UE using the second protocol associated with the second protocol identifier. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

In some aspects of wireless communication, e.g., 5G NR, a small cell base station may be deployed to provide wireless coverage. The small cell base station, in some aspects supports one of FR1 (e.g., a sub-6 GHz band and/or protocol) or FR2 (e.g., a millimeter wave (mmWave) band and/or protocol). Aspects presented herein provide a flexible small cell base station and/or a flexible small cell base station architecture that supports both FR1 and FR2. In some aspects, the flexible small cell base station may support communication via both FR1 and FR2 simultaneously. Accordingly, the flexible small cell base station may provide a cost-effective solution to achieve the coverage of a first small cell base station supporting FR1 and the speed of a second small cell base station supporting FR2. Additionally, the flexible small cell base station may provide seamless transition from FR1 to FR2 for a UE in communication with the flexible small cell base station.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a network node including at least one processor coupled to a memory and configured to receive, from a first user equipment (UE), a first transmission including a first protocol identifier, communicate with the first UE using a first protocol associated with the first protocol identifier, receive, from a second UE, a second transmission including a second protocol identifier, and communicate with the second UE using a second protocol associated with the second protocol identifier.

Aspect 2 is the apparatus of aspect 1, where the first protocol is a mmWave protocol and the second protocol is a sub-6 GHz protocol.

Aspect 3 is the apparatus of any of aspects 1 and 2, where the at least one processor is further configured to configure a first PCIe interface for communicating with a first modem associated with the first protocol and configure a second PCIe interface for communicating with a second modem associated with the second protocol.

Aspect 4 is the apparatus of aspect 3, where to configure the first PCIe interface, the at least one processor is further configured to identify at least one of (1) the first protocol associated with the first PCIe interface, (2) first firmware associated with the first PCIe interface, or (3) a first configuration associated with the first PCIe interface based on a first identifier associated with the first PCIe interface, and where to configure the second PCIe interface, the at least one processor is further configured to identify at least one of (1) the second protocol associated with the second PCIe interface, (2) second firmware associated with the second PCIe interface, or (3) a second configuration associated with the second PCIe interface based on a second identifier associated with the second PCIe interface.

Aspect 5 is the apparatus of aspect 3, where the at least one processor is further configured to configure a shared kernel space for communicating with the first PCIe interface and the second PCIe interface.

Aspect 6 is the apparatus of aspect 5, where the shared kernel space is configured to identify whether a communication received from at least one UE is associated with the first PCIe interface or the second PCIe interface.

Aspect 7 is the apparatus of any of aspects 1 and 6, where the at least one processor is further configured to receive, from the first UE, a third transmission including the second protocol identifier, where the first UE determines that a communication using the second protocol is better than the communication using the first protocol and communicate with the first UE using the second protocol associated with the second protocol identifier.

Aspect 8 is the apparatus of any of aspects 1 and 7, where the apparatus is one of the network node, a network entity, a base station, or a small cell base station.

Aspect 9 is the apparatus of any of aspects 1 and 8, where the at least one processor is further configured to configure a user space with a first set of applications associated with the first protocol, and configure the user space with a second set of applications with the second protocol.

Aspect 10 is the apparatus of any of aspects 1 and 9, further including a transceiver coupled to the at least one processor.

Aspect 11 is an apparatus for wireless communication at a network node, including a shared kernel space driver for a first PCIe interface and a second PCIe interface, a first modem connected to the shared kernel space driver via the first PCIe interface, and a second modem connected to the shared kernel space driver via the second PCIe interface.

Aspect 12 is the apparatus of aspect 11, further including a shared user space associated with the shared kernel space driver, where the shared user space supports one or more user space applications.

Aspect 13 is the apparatus of aspect 12, where each user space application in the one or more user space applications includes a first module associated with the first PCIe interface and a second module associated with the second PCIe interface.

Aspect 14 is the apparatus of aspect 13, where the shared user space includes at least one API for communicating with the one or more user space applications.

Aspect 15 is the apparatus of any of aspects 11 to 14, further including a first module for identifying whether a communication received from a first UE is associated with a first protocol or a second protocol.

Aspect 16 is the apparatus of any of aspects 11 to 15, where the first modem is associated with a mmWave protocol and the second modem is associated with a sub-6 GHz protocol.

Aspect 17 is the apparatus of aspect 16, where the first modem provides PHY layer processing for a first set of communications using the mmWave protocol and the second modem provides PHY layer processing for a second set of communications using the sub-6 GHz protocol.

Aspect 18 is the apparatus of any of aspects 11 to 17, where the shared kernel space driver is configured to identify for each of the first modem and the second modem at least one of: an associated protocol, associated firmware, or an associated configuration based on a sub-identifier associated with each of the first modem and the second modem.

Aspect 19 is the apparatus of any of aspects 11 to 18, where the apparatus is one of, the network node, a network entity, a base station, or a small cell base station.

Aspect 20 is the apparatus of any of aspects 11 to 19, further including a transceiver.

Aspect 21 is a method of wireless communication for implementing any of aspects 1 to 20.

Aspect 22 is an apparatus for wireless communication including means for implementing any of aspects 1 to 20.

Aspect 23 is a computer-readable medium storing computer executable code, where the code when executed by a processor causes the processor to implement any of aspects 1 to 20.

What is claimed is:

1. An apparatus for wireless communication at a network node, comprising:
   a memory; and
   at least one processor coupled to the memory and configured to:
      receive, from a first user equipment (UE), a first transmission including a first protocol identifier;
      communicate with the first UE using a first protocol associated with the first protocol identifier;
      receive, from a second UE, a second transmission including a second protocol identifier;
      receive, from the second UE, a third transmission including the first protocol identifier, wherein the second UE determines that a communication using the first protocol is better than the communication using the second protocol; and
      communicate with the second UE using the first protocol associated with the first protocol identifier; and
      communicate with the second UE using a second protocol associated with the second protocol identifier.

2. The apparatus of claim 1, wherein the first protocol is a millimeter wave (mmWave) protocol and the second protocol is a sub-6 GHz protocol.

3. The apparatus of claim 1, wherein the at least one processor is further configured to:
   configure a first peripheral component interconnect express (PCIe) interface for communicating with a first modem associated with the first protocol; and
   configure a second PCIe interface for communicating with a second modem associated with the second protocol.

4. The apparatus of claim 3, wherein to configure the first PCIe interface, the at least one processor is further configured to identify at least one of (1) the first protocol associated with the first PCIe interface, (2) first firmware associated with the first PCIe interface, or (3) a first configuration associated with the first PCIe interface based on a first identifier associated with the first PCIe interface, and
   wherein to configure the second PCIe interface, the at least one processor is further configured to identify at least one of (1) the second protocol associated with the second PCIe interface, (2) second firmware associated with the second PCIe interface, or (3) a second configuration associated with the second PCIe interface based on a second identifier associated with the second PCIe interface.

5. The apparatus of claim 3, wherein the at least one processor is further configured to:
   configure a shared kernel space for communicating with the first PCIe interface and the second PCIe interface.

6. The apparatus of claim 5, wherein the shared kernel space is configured to identify whether a communication received from at least one UE is associated with the first PCIe interface or the second PCIe interface.

7. The apparatus of claim 1, wherein the apparatus is one of the network node, a network entity, a base station, or a small cell base station.

8. The apparatus of claim 1, wherein the at least one processor is further configured to:
 configure a user space with a first set of applications associated with the first protocol; and
 configure the user space with a second set of applications with the second protocol.

9. The apparatus of claim 1 further comprising a transceiver coupled to the at least one processor.

10. A method for wireless communication at a network node, comprising:
 receiving, from a first user equipment (UE), a first transmission including a first protocol identifier;
 communicating with the first UE using a first protocol associated with the first protocol identifier;
 receiving, from a second UE, a second transmission including a second protocol identifier; and
 communicating with the second UE using a second protocol associated with the second protocol identifier;
 receiving, from the second UE, a third transmission including the first protocol identifier, wherein the second UE determines that a communication using the first protocol is better than the communication using the second protocol; and
 communicating with the second UE using the first protocol associated with the first protocol identifier.

11. The method of claim 10, wherein the first protocol is a millimeter wave (mmWave) protocol and the second protocol is a sub-6 GHz protocol.

12. The method of claim 10, further comprising:
 configuring a first peripheral component interconnect express (PCIe) interface for communicating with a first modem associated with the first protocol; and
 configuring a second PCIe interface for communicating with a second modem associated with the second protocol.

13. The method of claim 12, wherein configuring the first PCIe interface comprises identifying at least one of: the first protocol associated with the first PCIe interface, first firmware associated with the first PCIe interface, or a first configuration associated with the first PCIe interface based on a first identifier associated with the first PCIe interface, and
 wherein configuring the second PCIe interface comprises identifying at least one of: the second protocol associated with the second PCIe interface, second firmware associated with the second PCIe interface, or a second configuration associated with the second PCIe interface based on a second identifier associated with the second PCIe interface.

14. The method of claim 12, further comprising:
 configuring a shared kernel space for communicating with the first PCIe interface and the second PCIe interface.

15. The method of claim 14, wherein the shared kernel space is configured to identify whether a communication received from at least one UE is associated with the first PCIe interface or the second PCIe interface.

16. The method of claim 10, wherein the network node is one of a network entity, a base station, or a small cell base station.

17. The method of claim 10, further comprising:
 configuring a user space with a first set of applications associated with the first protocol; and
 configuring the user space with a second set of applications with the second protocol.

* * * * *